United States Patent [19]

Hauser

[11] Patent Number: 4,927,304
[45] Date of Patent: May 22, 1990

[54] HOLDER FOR ROTARY MATERIAL REMOVING TOOLS

[76] Inventor: Hermann Hauser, Otto-Lilienthal-Strasse 4, D-7835 Teningen 3, Fed. Rep. of Germany

[21] Appl. No.: 317,727

[22] Filed: Mar. 2, 1989

[30] Foreign Application Priority Data

Mar. 4, 1988 [DE] Fed. Rep. of Germany ....... 3807102

[51] Int. Cl.$^5$ .............................................. B23C 1/00
[52] U.S. Cl. ..................................... 409/231; 409/232
[58] Field of Search ............... 409/230, 231, 232, 234, 409/144; 279/4, 23 R, 66, 76, 79

[56] References Cited

U.S. PATENT DOCUMENTS

| | | | |
|---|---|---|---|
| 1,802,053 | 4/1931 | Halborg | 279/79 |
| 2,286,292 | 6/1942 | Mall | 409/231 |
| 3,085,812 | 4/1963 | Rosenthal et al. | 279/76 |
| 4,758,122 | 7/1988 | Kubo | 409/231 |

FOREIGN PATENT DOCUMENTS 3235820 7/1983 Fed. Rep. of Germany ...... 409/231
2471256 6/1981 France ................................ 409/234

*Primary Examiner*—Daniel Howell
*Attorney, Agent, or Firm*—Peter K. Kontler

[57] ABSTRACT

A holder for rotary material removing tools which are used in machine tools has a housing with two coaxial sections which can be held end-to-end by a set of male coupling elements provided in one of the sections and extending into a groove of the other section. The other section carries a shaft or spindle which transmits torque to a material removing tool, and the other section is separable from the one section when the male coupling elements are extracted from the groove by discrete fluid-operated motors which can move the male coupling elements against the opposition of stressed coil springs. The tips of the male coupling elements bear against the other section in operative positions of the male coupling elements to thereby urge an end face of the other section against an adjacent end face of the one section.

31 Claims, 2 Drawing Sheets

HOLDER FOR ROTARY MATERIAL REMOVING TOOLS

BACKGROUND OF THE INVENTION

The invention relates to tool holders in general, and more particularly to improvements in holders for rotary tools which can be used in automatic machine tools, such as drilling, boring, grinding, milling and/or other machines. Still more particularly, the invention relates to improvements in tool holders of the type wherein a housing supports a rotary spindle or shaft for one end portion of a rotary material removing or like tool, e.g., a grinding wheel.

It is already known to install a two-part spindle for a rotary material removing tool in a composite (multiple-section) housing. The two parts of the spindle are connectable to each other by a quick-release coupling, and the sections of the housing are also separable from each other so that the section which supports the tool-carrying portion of the spindle can be detached from another section. This renders it possible to inspect the tool, to replace the tool with a fresh tool, or to replace the detachable section with or without a tool on the respective part of the spindle.

A machine which is designed to treat complex workpieces must be equipped or furnished with a number of different tools which are needed to carry out different operations on a particular workpiece or to carry out different operations upon successively treated workpieces. This also applies for numerically controlled machines wherein the treatment is automated, either fully or to a large extent, in order to increase the output and to reduce the likelihood of unsatisfactory treatment due to human errors. In other words, even the operation of a fully automated machine tool or another machine must be interrupted for a relatively long interval of time if a previously used tool is to be replaced with a fresh tool or with a different tool.

Attempts to avoid lengthy interruptions of operation of fully automated machines involve the transfer of workpieces from machine to machine so that each machine can operate with a particular tool or a particular set of tools. Thus, such proposal renders it possible to avoid frequent replacement of tools in a particular machine but it exhibits the drawback that valuable time is lost for transfer of workpieces from machine to machine. Moreover, each transfer of a workpiece from a preceding machine into a following machine involves the risk of inaccurate positioning of the workpiece with reference to the material removing and/or other work treating instrumentalities. Therefore, such production lines must be equipped with complex and expensive monitoring devices which ascertain the position of a workpiece in each machine and with complex, expensive and sensitive means for adjusting the position of the workpiece prior to treatment.

It was further proposed to provide a holder for tools which are provided with hollow conical mandrels. The mandrel of a tool which is to be affixed to the holder confronts the holder and has an internal recess or groove for portions of clamping tongs which serve to draw the mandrel into the holder. The tongs can act upon a package of dished springs through the medium of a rod. The springs bias the tool to its operative position relative to the holder, and their bias can be assisted by a system of wedges. The means for disengaging the tool from such holder includes a piston which is reciprocable in a hydraulic cylinder and can be moved to a position in which it compresses the package of springs and disengages the system of wedges to thereupon open the tongs through the medium of the aforementioned rod. The tool is released and can be expelled from the holder in response to forward movement of the rod and the resulting opening of the tongs.

The tongs, the rod, the package of dished springs and the system of wedges rotate with the tool and with the hydraulic cylinder. This exhibits the advantage that the relatively long and sleek mandrel of the tool can be readily separated from the holder in spite of the need for the establishment of a pronounced retaining force when the tool is in use and is driven at a very high speed. Moreover, the just discussed holder can rotate without overly stressing the bearings for its rotary parts. However, the combined mass of all rotary parts is very high which is undesirable if the tool is to be rapidly accelerated or decelerated.

Commonly owned German Pat. No. 33 34 001 discloses a holder for grinding tools wherein the tool carrying spindle rotates in a twin-section housing. The section which carries the spindle is connected to the other section by a bayonet mount. The patent proposes to provide centering surfaces at both axial ends of the bayonet mount in order to reduce the likelihood of bending of the spindle when the holder is in use in a machine tool. The bayonet mount must be engaged and disengaged by hand. In addition, the bayonet mount cannot compensate for manufacturing and/or other tolerances, and the patented holder is effective only when the RPM of the spindle is below a certain value.

OBJECTS OF THE INVENTION

An object of the invention is to provide a novel and improved holder which renders it possible to rapidly exchange a rotary tool, either by hand or automatically.

Another object of the invention is to provide a tool holder which can maintain the tool in an accurately determined position and is capable of compensating for manufacturing tolerances as well as for wear upon its parts.

A further object of the invention is to provide a novel and improved coupling between separable sections of the above outlined holder.

An additional object of the invention is to provide a holder which is effective at any practical RPM of a rotary tool including rotational speeds above those which can be achieved with a tool in a standard holder.

Still another object of the invention is to provide the tool holder with novel and improved means for automatically separating its parts when a tool is to be replaced or inspected.

A further object of the invention is to provide a novel and improved housing for the tool spindle in the above outlined holder.

An additional object of the invention is to provide a machine which embodies the above outlined holder.

Another object of the invention is to provide a tool holder which is particularly suitable for automatic attachment or detachment of the tool spindle to and from its housing.

A further object of the invention is to provide the tool holder with novel and improved means for ensuring that the tool can be used in the event of failure of certain component parts of the holder.

An additional object of the invention is to provide a novel and improved method of rapidly coupling or decoupling the tool-carrying part of a rotary spindle to and from the housing of the above outlined holder.

A further object of the invention is to provide a tool holder which exhibits the above outlined features and can be used as a superior substitute for conventional tool holders in existing automatic, semiautomatic or other grinding, boring, drilling, milling and analogous machines.

SUMMARY OF THE INVENTION

The invention is embodied in a holder for material removing tools and the like. The improved holder comprises a housing including coaxial first and second sections, a tool supporting spindle which projects from and has a torque-transmitting portion mounted in the first section, and means for releasably coupling the sections to each other, preferably end-to-end. The coupling means includes a plurality of male coupling elements mounted in one of the sections for movement between operative and inoperative positions, a female coupling device provided in the other section to receive portions of male coupling elements in operative positions of the male coupling elements, and motor means for moving the male coupling elements to at least one of their positions. The aforementioned portions (e.g., conical or wedge-like tips) of the male coupling elements have surfaces which urge the first section of the housing axially toward the second section in operative positions of the male coupling elements. The surfaces on the aforementioned portions of the male coupling elements can be inclined with reference to the common axis of the first and second sections. The spindle preferably further comprises a second portion in the second section of the housing, and a quick-release coupling between the second portion and the torque-transmitting portion of the spindle.

The second section of the housing can be provided with a socket for a projection of the first section. The projection is received in the socket in operative positions of the male coupling elements, and such male coupling elements can be movably mounted in the second section of the housing. The female coupling device can comprise an interrupted or circumferentially complete groove in the first section.

The motor means can include fluid-operated (i.e., hydraulic or pneumatic) motors for the male coupling elements. For example, the motor means can comprise a cylinder for each male coupling element and a reciprocable piston in each cylinder. The pistons are connected to the corresponding male coupling elements. The arrangement can be such that the motor means is operative to move the male coupling elements to inoperative positions; the improved holder then further comprises means for yieldably biasing the male coupling elements to operative positions. Such biasing means can comprise at least one spring (e.g., a stressed coil spring) for each male coupling element. The cylinders of the fluid-operated motors preferably define straight paths for reciprocatory movement of male coupling elements and pistons between operative and inoperative positions. Each male coupling element can constitute or resemble a pin or stud which is coaxial with the respective piston. The male coupling elements extend from first end faces of the respective pistons, and the aforementioned springs react against the one section and bear against the other end faces of the respective pistons. The paths along which the male coupling elements are reciprocable relative to the one section preferably make oblique angles with the common axis of first and second sections of the housing. The same applies for the axes of cylinders which form part of the motors for the male coupling elements.

It is also possible to install the male coupling elements in such a way that they are reciprocable along paths extending substantially radially of the common axis of the first and second housing sections. The surfaces on the aforementioned portions of the male coupling elements are preferably inclined with reference to the common axis of the sections.

The number of male coupling elements preferably exceeds two (for example, the coupling means can comprise three, five, seven or another odd number of male coupling elements), and the male coupling elements are or can be equidistant from each other in the circumferential direction of the sections.

The sections of the housing can be provided with end faces which abut each other in operative positions of the male coupling elements. Furthermore, the sections of the housing can be provided with cooperating centering surfaces one of which surrounds the other centering surface in operative positions of the male coupling elements. The centering surfaces are or can be adjacent the female coupling device. The arrangement may be such that each centering surface comprises two annular portions which are spaced apart from each other in the direction of the common axis of the sections in such a way that the female coupling device is disposed between the first and second portions of each centering surface.

Still further, the sections of the housing can be provided with complementary conical external and internal surfaces which abut each other (e.g., in a region adjacent the aforementioned centering surfaces and the aforementioned end faces) in operative positions of the male coupling elements.

The holder can further comprise means for preferably automatically separating the sections from each other in inoperative positions of the male coupling elements. The separating means can comprise at least one ejector which is movably installed in at least one of the sections and serves to urge the other section axially and away from the at least one section. The ejector is movable between an extended position in which the sections are separated from each other and a retracted position, and such separating means further comprises means for biasing the ejector to retracted position, and preferably fluid-operated motor means for moving the ejector to extended position. Such motor means can be operatively connected with the aforediscussed motor means for moving the male coupling elements to inoperative positions in such a way that the operation of motor means for the ejector or ejectors is delayed in order to ensure that the ejector or ejectors are moved to extended position(s) only when the movement of male coupling elements to inoperative positions is already completed. The motor means for the ejector or ejectors and the motor means for the male coupling elements can receive pressurized fluid from a common source, preferably in such a way that the motor means for the ejector or ejectors receives pressurized fluid by way of one or more motors for the male coupling elements. This ensures that the movement of each ejector to its extended position cannot precede completion of movement of all male coupling elements to their inoperative positions.

The novel features which are considered as characteristic of the invention are set forth in particular in the appended claims. The improved tool holder itself, however, both as to its construction and the mode of operating the same, together with additional features and advantages thereof, will be best understood upon perusal of the following detailed description of certain specific embodiments with reference to the accompanying drawing.

DESCRIPTION OF PREFERRED EMBODIMENTS

Figure 1:
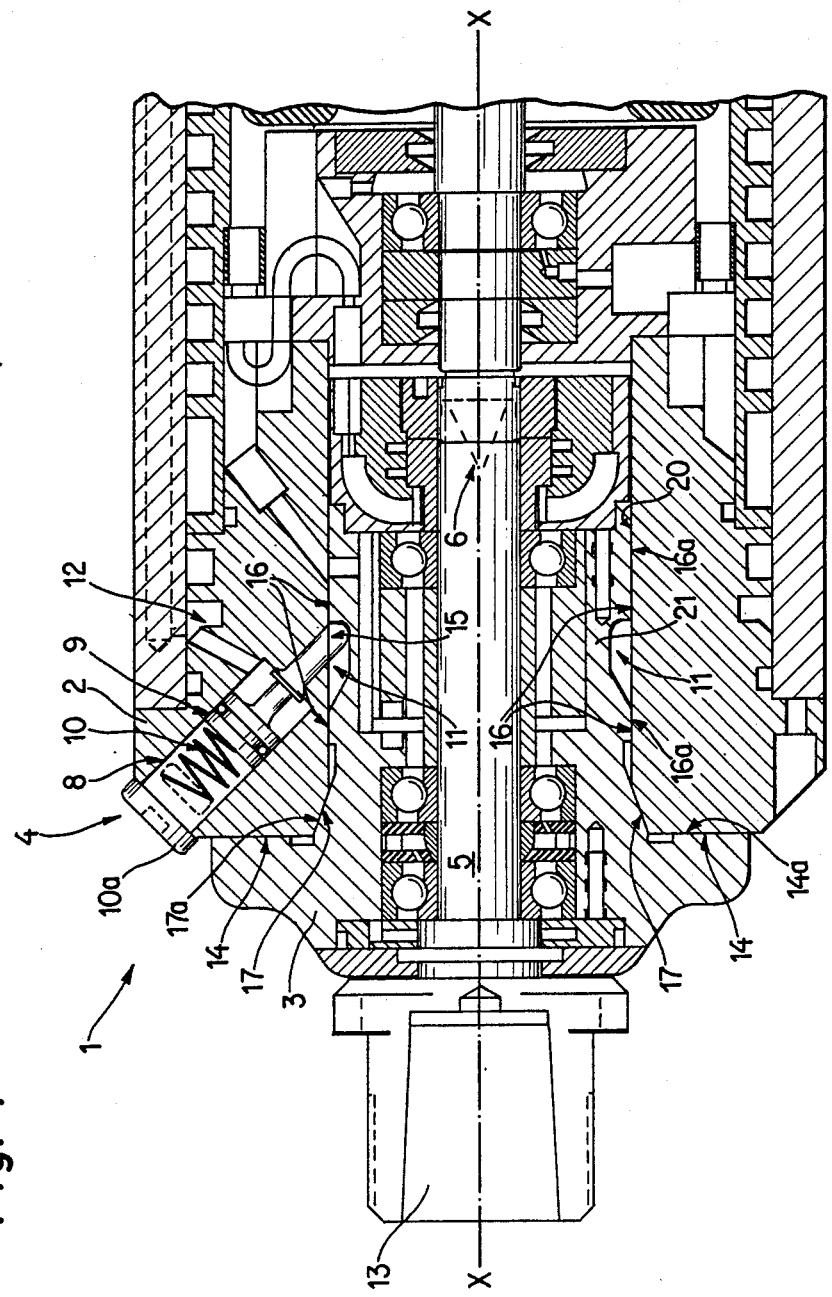
FIG. 1 is a fragmentary axial sectional view of a tool holder which embodies one form of the invention and wherein the male coupling elements are reciprocable along paths which make oblique angles with the common axis of the housing sections.

Referring first to FIG. 1, there is shown a holder 1 for material removing tools (not shown). A selected tool can be affixed to the exposed tool carrying member 13 of a rotary spindle 5. The spindle 5 includes a first (torque-transmitting) portion which is rotatably journalled in the first or front section 3 of a housing. The latter further comprises a second or rear section 2 which is coaxial with the section 3 and is installed in a machine tool, e.g., in a drilling, boring, milling, grinding, polishing or other machine having means for rotating and guiding one or more rotary tools. The tool holder 1 further comprises novel and improved means 4 for separably coupling the section 3 to the section 2, end-to-end, and a quick release coupling 6 between the first portion of the spindle 5 and a second portion which is rotatably installed in the section 2. The front end face 14 of the section 2 has a centrally located socket 20 for a complementary projection 21 of the section 3. The socket 20 fully (or practically fully) receives the projection 21 when the coupling means 4 is operative, i.e., when the section 3 is separably but fixedly attached to the section 2 so that a rear end face 14a of the section 3 abuts the front end face 14 of the section 2. The end faces 14, 14a constitute stops which determine the extent of penetration of projection 21 into the socket 20.

The coupling means 4 between the sections 2, 3 of the housing of the holder 1 preferably constitutes a so-called quick-release coupling which can be disengaged or rendered inoperative within a very short interval of time in order to enable an operator or a robot to rapidly replace the section 3 and the tool on the tool carrying member 13 of the spindle 5 with another section which carries a fresh tool or a different tool. The coupling 6 is preferably of the type which establishes a torque transmitting connection between the two portions of the spindle 5 in automatic response to proper coupling of section 3 to the section 2.

The coupling 4 comprises an uneven number (e.g., seven) of male coupling elements 7 in the form of pins or studs having conical tips 15 and being rigid with pistons 9 forming part of fluid-operated motors (e.g., hydraulic motors) which further comprise cylinders 8 in the section 2. The rear end face of each piston 9 is biased inwardly toward the projection 21 of the section 3 by a coil spring 10 which is installed in the rear or outer portion of the respective cylinder 8 and is maintained in stressed condition by a screw cap 10a. The pins 7 are rigid with and extend centrally from the inner end faces of the respective pistons 9.

The coupling 4 further comprises a female coupling device in the form of a circumferentially complete groove 11 which is machined into or is otherwise formed in the peripheral surface of the projection 21 forming part of the section 3. The positions of the groove 11 and pins 7 can be reversed without departing from the spirit of the invention; however, it is presently preferred to provide the groove 11 in the detachable front section 3 because the making of such groove is less expensive than the installation of a plurality of male coupling elements in each of a large number of sections 3. The pins 7 are equidistant from each other in the circumferential direction of the sections 2 and 3. The number of pins 7 (of which only one is shown in FIG. 1) can be reduced to less than seven or increased to more than seven, depending on the dimensions of the section 2, on the dimensions of the pins, and on the required magnitude of coupling force in operative positions of the pins, i.e., in those positions when the surfaces at the tips 15 of the pins 7 engage the adjacent surface in the groove 11 to urge the section 3 in a direction to maintain the end face 14a in abutment with the end face 14. The surfaces of the tips 15 are inclined with reference to the common axis X—X of the sections 2 and 3.

Figure 2:
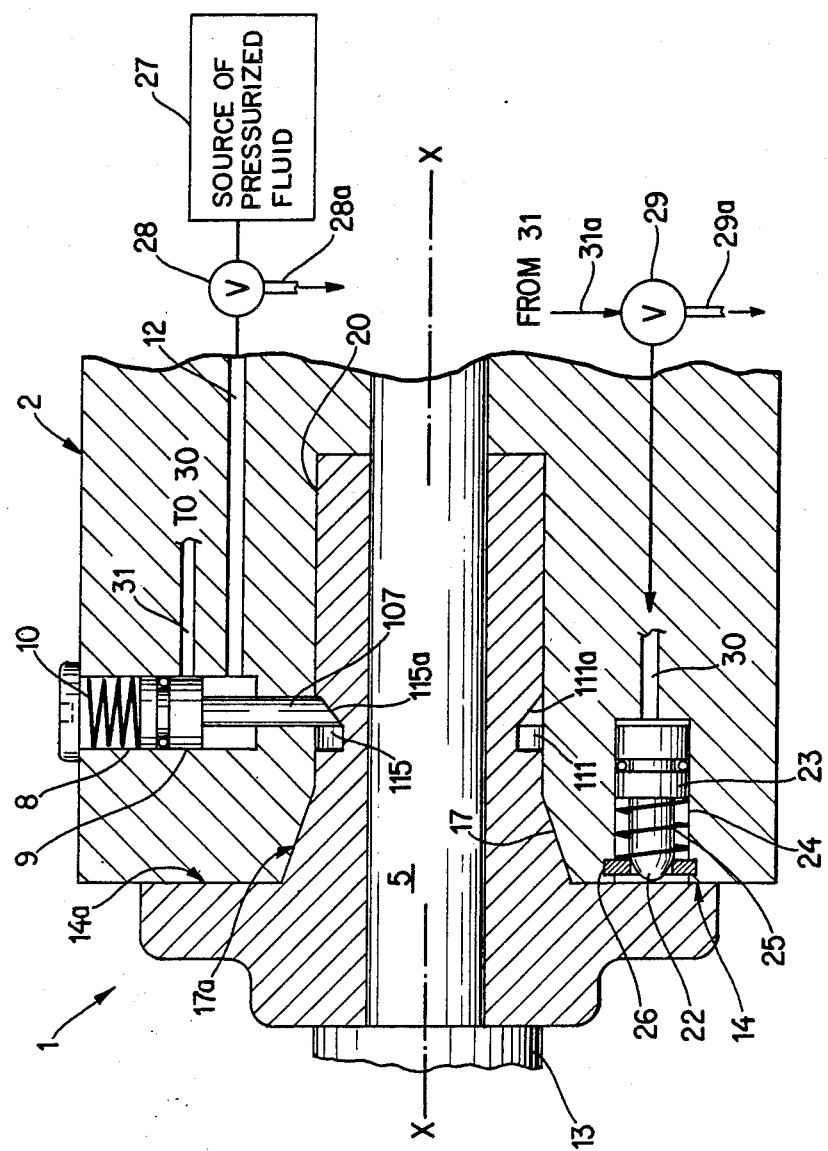
FIG. 2 shows a detail of a modified tool holder wherein the male coupling elements are movable substantially at right angles to the common axis of the housing sections and such housing sections can be automatically separated from each other.

The means for supplying a pressurized fluid (e.g., air or oil) to the inner end portions of the cylinders 8 (in order to move the pins 7 to inoperative positions) comprises channels 12 or other passages which are provided in the section 2 and receive pressurized fluid from a suitable source (note the source 27 in FIG. 2) by way of a valve (note the valve 28 in FIG. 2). The valve 28 can be adjusted to admit pressurized fluid from the source 27 into the channels 12 (i.e., to cause the coil springs 10 to store energy in response to movement of pins 7 to their inoperative or retracted positions) or to discharge liquid fluid (as at 28a) into a tank (not shown) which, in turn, supplies liquid fluid to the source 27 (if the fluid is a liquid). The conduit 28a discharges spent fluid into the atmosphere if the fluid is air or another gas. The valve 28 can be adjusted automatically by the controls of the machine in which the tool holder 1 is installed, e.g., in a numerically controlled machine tool.

While it is equally possible to reverse the functions of the springs 10 and fluid-operated motor means including the cylinders 8 and pistons 9, it is presently preferred to use the springs 10 as a means for biasing the pins 7 to their operative positions (into the groove 11) because this ensures that the section 3 remains properly coupled to the section 2 (and the tool on the spindle 5 can be used) even in the event of temporary failure of the hydraulic or pneumatic system which is to supply pressurized fluid to the cylinders 8 when the pins 7 are to be moved to inoperative or retracted positions.

The pins 7 are installed in such a way that they move along paths which make oblique angles with the common axis X—X of the sections 2 and 3. These pins reciprocate between their operative and inoperative positions, i.e., the inclination of the axes of cylinders 8 relative to the axis X—X is the same as that of the axes of the pins 7.

When the pins 7 are retracted, the section 3 can be disengaged from the section 2, together with the front portion of the spindle 5 and the tool on the tool carrying member 13 of the spindle, for the purpose of inspection, replacement of the tool with a different tool (on the section 3) or replacement of the section 3 with another section. As mentioned above, the section 3 can be replaced by hand or by an automatic changer of any known design.

The surfaces at the tips 15 of the pins 7 cooperate with the adjacent surface in the groove 11 of the properly coupled section 3 in such a way that the end face 14a is caused to bear against the end face 14 to thus ensure that the section 3 is maintained in a predetermined axial position with reference to the section 2 and that the two portions of the spindle 5 are properly connected to each other by the quick-release coupling 6.

The projection 21 of the section 3 has a peripheral centering surface 16a which cooperates with a complementary internal centering surface 16 of the section 2 to ensure that the spindle 5 is coaxial with the sections 2, 3 when the pins 7 are free to assume their operative positions under the action of the respective springs 10. Each of the centering surfaces 16, 16a preferably includes two portions which flank the groove 11 of the projection 21. Thus, the left-hand portions of the centering surfaces 16, 16a are located at one axial end of the groove 11, and the right-hand portions of the centering surfaces are located at the other axial end of the groove. These centering surfaces relieve the coupling 4 in that they prevent any, or any appreciable, flexing of the section 3 relative to the section 2 and/or appreciable deformation of the section 2 around the socket 20.

It has been found that the centering surfaces 16, 16a cooperate with the end faces 14, 14a to ensure highly predictable retention of the projection 21 in the socket 20 and an equally predictable positioning of the tool on the carrier member 13 with reference to the housing including the sections 2 and 3. This, in turn, contributes to accuracy of the material removing and/or other action of the tool upon a workpiece, e.g., in a grinding, boring, drilling, milling or other machine.

The socket 20 is preferably formed with a substantially funnel-shaped inlet bounded by an outwardly diverging conical internal surface 17 which facilitates insertion of projection 21 into the socket 20 and abuts a complementary external conical surface 17a of the section 3 when the springs 10 are free to maintain the pins 7 in operative positions, i.e., when the end face 14a of the section 3 abuts the end face 14 of the section 2. The conical internal surface 17 is adjacent the left-hand portion of the centering surface 16 which surrounds a portion of the socket 20 in the section 2.

The aforediscussed inclination of the cylinders 8 and pins 7 relative to the axis X—X is desirable and advantageous because the springs 10 cause the pins 7 to urge the projection 21 deeper into the socket 20 and thus urge the end face 14a against the end face 14. Such accurate positioning of the section 3 relative to the section 2 remains intact even if the spindle 5 is driven to rotate at an extremely high speed, e.g., in excess of 100,000 revolutions per minute. In addition, the inclined pins 7 can compensate for certain tolerances in the machining of component parts of the holder 1 and/or for a certain amount of wear on such parts.

FIG. 2 shows a portion of a modified holder 1. All such parts of this holder which are identical with or clearly analogous to corresponding parts of the holder 1 of FIG. 1 are denoted by similar reference characters. The modified holder 1 has a set of male coupling elements 107 which are reciprocable radially of the housing section 2, i.e., substantially at right angles to the axis X—X. The tips 115 of the coupling elements 107 have inclined surfaces 115a which engage the adjacent surface 111a in the groove 111 of the housing section 3 (in the operative positions of the coupling elements 107) to urge the end face 14a into abutment with the end face 14 and to thus locate the section 3 in a predetermined axial position with reference to the section 2.

The holder 1 of FIG. 2 further comprises means for separating the section 3 and the torque-transmitting portion of the spindle 5 from the section 2 and the second portion of the spindle in response to movement of male coupling elements 107 to their inoperative or retracted positions. The separating means comprises one or more ejectors 22 (only one shown in FIG. 2) having rounded or otherwise configured free end portions or tips adjacent the end face 14a of the section 3. A coil spring 25 which reacts against a split ring 26 in an internal groove of the section 2 bears against the respective end face of a piston 23 which is reciprocable in an axially parallel cylinder 24 of the section 2 and can be moved to the left (as seen in FIG. 2) in response to admission of pressurized fluid (e.g., oil) from the source 27 via channel 30 having a discharge end adjacent the right hand end face of the piston 23. The cylinder 24 and its piston 23 constitute a fluid-operated motor which is operated with a certain delay following operation of the motors including the cylinders 8 and pistons 9 for the male coupling elements 107. The delay is such that the tips 115 of the male coupling elements 107 are extracted from the groove 111 when the piston 23 is caused to stress the spring 25 and to move the end face 14a of the section 3 away from the end face 14 of the section 2.

While it is possible to employ any one of a number of known delaying means, FIG. 2 shows that the peripheral surface of the piston 9 seals the inlet of a channel 31 which can receive pressurized fluid from the channel 12 via cylinder 8 when the piston 9 assumes an axial position corresponding or close to inoperative or retracted position of the male coupling element 107 of FIG. 2. A stream of pressurized fluid is then free to flow from the channel 12 into the channel 31, whence the pressurized fluid flows into the cylinder 24 by way of the channel 30 and a conduit 31a which connects the channel 31 with the channel 30 and contains a two-way valve 29. The valve 29 is normally set to permit pressurized fluid to flow from the channel 31 into the channel 30. However, when the section 3 is reattached to the section 2, the position of valving element in the valve 29 is changed so that the channel 30 then communicates with a conduit 29a leading to a tank (not shown) which contains a supply of pressurized liquid fluid for the source 27. The latter can constitute a pump which draws oil or another liquid medium from the tank for readmission into the channel 12 via valve 28. If the pressurized fluid is air or another gas, the conduit 29a discharges spent air into the atmosphere when the spring 25 is free to expand and to move the ejector 22 back to the retracted position of FIG. 2. The same applies for the conduit which admits the fluid into the tank if the fluid is oil but which discharges the fluid into the surrounding atmosphere if the fluid is a gaseous fluid. The valves 28 and 29 can be operated by the controls of the machine in which the holder 1 of FIG. 2 is put to use.

The provision of one or more ejectors 22 (the number of ejectors may but need not match the number of pistons 9 and male coupling elements 107) is particularly desirable and advantageous if the projection 21 of the section 3 has an elongated slender conical portion (note the conical external surface 17a) which is in pronounced frictional engagement with the conical internal surface 17 of the section 2 when the section 3 is properly coupled to the section 2, i.e., when the tips 115 of the male coupling elements 107 are properly received in the groove 111 and bear against the surface 111a to thereby urge the end face 14a against the end face 14 while simultaneously urging the conical surface 17a against the complementary conical surface 17.

Each cylinder 24 can receive pressurized fluid from a discrete cylinder 8, or all cylinders 24 (if the holder 1 of FIG. 2 comprises two or more ejectors 22) can receive pressurized fluid by way of a single cylinder 8.

Delayed movement of the ejector or ejectors 22 to extended position(s) ensures that the separating means including the ejector or ejectors cannot interfere with movements of the male coupling elements 107 to their inoperative positions. In other words, the ejector or ejectors cannot cause the section 3 to offer excessive or unnecessarily high resistance to movement axially of and away from the section 2.

The illustrated means for delaying movement of the ejector 22 to its extended position can be modified in a number of ways or replaced with other types of delay means. For example, a signal from the controls of the machine to the valve 29 (to admit pressurized fluid from the source 27 or from a different source directly into the cylinder 24) can be generated with a preselected delay following transmission of a signal to the valve 28 in order to admit pressurized fluid from the source 27 into the channels 12 leading to the cylinders 8 of motors for the male coupling elements 107.

The common axis of the piston 23, cylinder 24 and ejector 22 can be inclined with reference to the axis X—X without departing from the spirit of the invention. Furthermore, the ejector or ejectors 22 (or other suitable means for separating the section 3 from the section 2) can be used with equal advantage in the tool holder 1 of FIG. 1. Still further, the carrier 13 can be omitted if the nature of the tool to be rotated by the spindle is such that a portion of the tool fits into a chuck, socket or like part of the spindle.

An important advantage of the improved tool holder is that the male coupling elements 7 or 107 generate a force which acts in the direction of the axis X—X and urges the projection 21 of the section 3 into the socket 20, i.e., which urges the end face 14a toward the end face 14. This ensures that the torque-transmitting portion of the spindle 5 invariably assumes a predetermined axial position as soon as the tips 15 or 115 of the male coupling elements 7 or 107 are properly received in the respective groove 11 or 111.

The provision of motor means which can move the male coupling elements 7 or 107 between their operative and inoperative positions (preferably to inoperative positions) is desirable and advantageous because this renders it possible to automatically disengage the coupling 4 as soon as the treatment of a particular workpiece with the tool on the carrier 13 of the spindle 5 is completed or as soon as replacement of a tool on the carrier 13 becomes necessary for another reason. The springs 10 are installed in stressed condition such as to ensure that the male coupling elements 7 or 107 invariably assume their operative positions when the respective motors including the cylinders 8 and pistons 9 are inactive. Such springs can further serve as a means to compensate for eventual machining tolerances as well as for a certain amount of wear upon the parts of the improved tool holder.

Another important advantage of the improved tool holder is that the sections 2, 3 of the housing need not rotate with the spindle 5. This reduces the mass of rotating parts and ensures that the shaft 5 can be rapidly accelerated from zero speed to a very high speed and vice versa. Moreover, this renders it possible to simplify the construction of means for supplying pressurized fluid to and for conveying fluid away from the motors because the fluid supplying and fluid conveying means need not rotate with the spindle 5. It has been found that the improved holder can properly support a spindle which is driven at speeds of up to and in excess of 100,000 revolutions per minute.

The mass of the detachable housing section 3 can be a relatively small fraction of the mass of the section 2. This is desirable and advantageous because the combined mass of parts which must be detached from the section 2 for the purpose of inspecting or replacing the tool is relatively small. The installation of male coupling elements 7 or 107, fluid-operated motors and ejector or ejectors 22 in the section 2 is desirable and advantageous for the same reason, i.e., the mass of detachable parts is small. In addition, there is more room for the male coupling elements, ejector or ejectors and motors in the relatively large section 2 of the housing.

It is also within the purview of the invention to provide the holder with electric, electromagnetic or other types of motors in lieu of the illustrated fluid-operated motors. Fluid-operated motors are preferred at this time because they occupy little room and can readily generate the forces which are necessary to move the male coupling elements 7 or 107 against the opposition of the springs 10 and to move the ejector or ejectors 22 against the opposition of the spring(s) 25.

Male coupling elements (7) which are inclined with reference to the axis X—X in a manner as shown in FIG. 1 are preferred at this time because the springs 10 are capable of causing the tips 15 of elements 7 to bear against the surfaces bounding the groove 11 with a force which suffices to maintain the end face 14a in abutment with the end face 14 even if the sections 2, 3 and/or other parts of the holder 1 of FIG. 1 are not machined with utmost precision. A higher degree of precision is necessary if the male coupling elements (107) are oriented in a manner as shown in FIG. 2.

The number of male coupling elements determines the reliability of connection between the sections 2 and 3. As mentioned above, the coupling elements are preferably equidistant from each other in the circumferential direction of the section 2.

The end faces 14, 14a need not serve to limit the extent of penetration of the projection 21 into the socket 20 if such function can be performed by the complementary conical surfaces 17, 17a, and vice versa. The conical surface 17 facilitates introduction of the projection 21 into the socket 20.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A holder for rotary material removing tools and the like, comprising a housing including coaxial first and second sections; a tool supporting spindle having a torque-transmitting portion mounted in said first section; and means for releasably coupling said sections to each other end-to-end, including a plurality of male coupling elements mounted in one of said sections for movement between operative and inoperative positions, a female coupling device provided in the other of said sections to receive portions of said male coupling elements in operative positions of said male coupling elements, and motor means for moving said male coupling elements to at least one of said positions, said portions of said male coupling elements urging said first section axially toward said second section in the operative positions of said male coupling elements.

2. The holder of claim 1, wherein said male coupling elements are inclined with reference to the common axis of said sections.

3. The holder of claim 1, wherein said spindle further includes a second portion in said second section, and a quick-release coupling between said second portion and said torque-transmitting portion.

4. The holder of claim 1, wherein said second section has a socket and said first section has a projection which is received in said socket in operative positions of said male coupling elements, said male coupling elements being movably mounted in said second section.

5. The holder of claim 4, wherein said female coupling device has at least one groove in said first section.

6. The holder of claim 1, wherein said motor means includes fluid-operated motors for said male coupling elements.

7. The holder of claim 1, wherein said motor means comprises a cylinder for each of said male coupling elements and a piston which is reciprocable in the cylinder and is connected with the respective male coupling element.

8. The holder of claim 1, wherein said motor means is operative to move said male coupling elements to inoperative positions; and further comprising means for biasing said male coupling elements to operative positions.

9. The holder of claim 8, wherein said biasing means comprises at least one spring for each male coupling element.

10. The holder of claim 1, wherein said male coupling elements are reciprocable between said operative and inoperative positions.

11. The holder of claim 10, wherein said male coupling elements includes pins and said motor means comprises a piston for each of said pins and a cylinder for each of said pistons, said pistons being reciprocable in the respective cylinders and being coaxial with and connected to the respective pins.

12. The holder of claim 10, wherein said motor means is operative to move said male coupling elements to inoperative positions and comprises a piston for each of said male coupling elements and a cylinder for each of said pistons, each of said pistons having a first end face and a second end face and said male coupling elements extending from the first end faces of the respective pistons; and further comprising means for biasing said male coupling elements to operative positions including springs reacting against said one section and bearing against the second end faces of said pistons.

13. The holder of claim 12, wherein said springs are prestressed coil springs.

14. The holder of claim 1, wherein said female coupling device has at least one groove in said other section.

15. The holder of claim 1, wherein said male coupling elements are reciprocable between said operative and inoperative positions along paths each making an oblique angle with the common axis of said sections.

16. The holder of claim 15, wherein said motor means includes a fluid-operated cylinder and piston unit for each of said male coupling elements, said units having cylinders each of which makes said oblique angle with the common axis of said sections.

17. The holder of claim 1, wherein said male coupling elements are reciprocable between operative and inoperative positions along paths extending substantially radially of said sections, said portions of said male coupling elements having surfaces making oblique angles with the common axis of said sections.

18. The holder of claim 1, wherein the number of said male coupling elements exceeds two.

19. The holder of claim 18, wherein said male coupling elements are equidistant from each other in the circumferential direction of said sections.

20. The holder of claim 1, wherein said sections have end faces which abut each other in the operative positions of said male coupling elements.

21. The holder of claim 1, wherein said sections have cooperating centering surfaces one of which surrounds the other thereof in operative positions of said male coupling elements.

22. The holder of claim 21, wherein said centering surfaces are adjacent said female coupling device.

23. The holder of claim 22, wherein each of said centering surfaces has two portions which are spaced apart from each other in the direction of the common axis of said sections, said female coupling device being disposed between the first and second portions of said centering surfaces.

24. The holder of claim 1, wherein said sections have complementary conical external and internal surfaces which abut each other in operative positions of said male coupling elements.

25. A holder for material removing tools and the like, comprising a housing including coaxial first and second sections; a tool supporting spindle having a torque-transmitting portion mounted in said first section; means for releasably coupling said sections to each other end-to-end, including a plurality of male coupling elements mounted in one of said sections for movement between operative and inoperative positions, a female coupling device provided in the other of said sections to receive portions of said male coupling elements in operative positions of said male coupling elements, and motor means for moving said male coupling elements to at least one of said positions, said portions of said male coupling elements urging said first section axially toward said second section in the operative positions of said male coupling elements; and means for separating said sections from each other in inoperative positions of said male coupling elements.

26. The holder of claim 25, wherein said separating means comprises at least one ejector movably installed in at least one of said sections and arranged to urge the other of said sections axially and away from the at least one section.

27. The holder of claim 25, wherein said separating means includes at least one ejector installed in at least one of said sections and movable between an extended position in which said sections are separated from each other and a retracted position, means for biasing said ejector to retracted position, and fluid-operated motor means for moving said ejector to extended position.

28. The holder of claim 27, wherein said motor means for said male coupling elements includes fluid-operated motor means operable to move said male coupling elements to inoperative positions; and further comprising a common source of pressurized fluid for said motor means.

29. The holder of claim 28, further comprising means for operating the motor means for said ejector with a delay following operation of motor means for said male coupling elements so that the male coupling elements assume their inoperative positions when said ejector is caused to move to said extended position.

30. The holder of claim 29, wherein said operating means includes a portion of at least one of the motor means for said male coupling elements.

31. The holder of claim 1, wherein said sections have cooperating centering surfaces which are adjacent to said female coupling device in the operative positions of said male coupling elements, and complementary conical surfaces which abut one another in the operative positions of said male coupling elements.

* * * * *